United States Patent [19]
Fujita et al.

[11] Patent Number: 5,500,794
[45] Date of Patent: Mar. 19, 1996

[54] DISTRIBUTION SYSTEM AND METHOD FOR MENU-DRIVEN USER INTERFACE

[75] Inventors: Yosuke Fujita, Allendale; Steve P. Lam, Cranbury, both of N.J.

[73] Assignee: Panasonic Technologies, Inc., Princeton, N.J.

[21] Appl. No.: 221,685

[22] Filed: Mar. 31, 1994

[51] Int. Cl.⁶ .................................................. G05B 15/02
[52] U.S. Cl. ................... 364/188; 364/189; 340/825.22; 379/102
[58] Field of Search ..................................... 364/188–190; 340/825.06, 825.07, 825.22, 825.24, 825.62, 825.69, 825.71, 825.72; 379/102, 104

[56] References Cited

U.S. PATENT DOCUMENTS

| | | |
|---|---|---|
| 4,344,127 | 8/1982 | McDaniel et al. . |
| 4,399,502 | 8/1983 | MacDonald et al. . |
| 4,413,314 | 11/1983 | Slater et al. . |
| 4,556,904 | 12/1985 | Monat . |
| 4,567,557 | 1/1986 | Burns . |
| 4,628,437 | 12/1986 | Poschmann et al. . |
| 4,706,121 | 11/1987 | Young . |
| 4,712,191 | 12/1987 | Penna . |
| 4,818,993 | 4/1989 | Stockel . |
| 4,959,721 | 9/1990 | Micic et al. . |
| 4,979,094 | 12/1990 | Gemmell et al. . |
| 5,038,401 | 8/1991 | Inotsume . |
| 5,086,385 | 2/1992 | Launey et al. . |
| 5,089,978 | 2/1992 | Lipner et al. . |
| 5,109,222 | 4/1992 | Welty ................................ 340/825.72 |
| 5,132,679 | 7/1992 | Kubo et al. . |
| 5,144,548 | 9/1992 | Salandro . |
| 5,170,338 | 12/1992 | Moritoki et al. . |
| 5,367,316 | 11/1994 | Ikezaki . |
| 5,373,324 | 12/1994 | Kuroda et al. . |
| 5,382,983 | 1/1995 | Kwoh et al. . |
| 5,396,546 | 3/1995 | Remillard . |
| 5,404,393 | 4/1995 | Remillard . |
| 5,412,773 | 5/1995 | Carlucci et al. . |

OTHER PUBLICATIONS

Advertising literature of Home Automation Laboratories, pp. 24–25.
Advertising literature of Custom Command Systems, Inc., 4 pages (copyrighted 1992.
CX Physical Layer & Media Specification, Index and pp. 1–41 (revised Mar. 1992).
The SMART HOUSE Development Venture, pp. 36–45 (copyrighted 1989 Parks Associates).
Davidson, Ken, "Echelon's Local Operating Network," *Circuit Cellar Ink*, pp. 74–77 (Jun./Jul. 1991).

Primary Examiner—Roy N. Envall, Jr.
Assistant Examiner—Thomas E. Brown
Attorney, Agent, or Firm—Ratner & Prestia

[57] ABSTRACT

An apparatus for distributing control menus over a multi-channel distribution network such as a CEBus throughout a home is disclosed. The apparatus includes a controller such as a personal computer for centrally generating control menus as video information on available channels of the multi-channel distribution network. The controller also executes commands received over the distribution network. The apparatus further includes a display device such as a TV for receiving and displaying the control menu on the channel selected by the control means and a receiver, located proximate to the display device, for receiving user commands related to the displayed menu and for delivering the user commands, via the distribution network, to the control processor. User commands can be given using, for example, infra-red transmission or voice recognition circuitry.

9 Claims, 10 Drawing Sheets

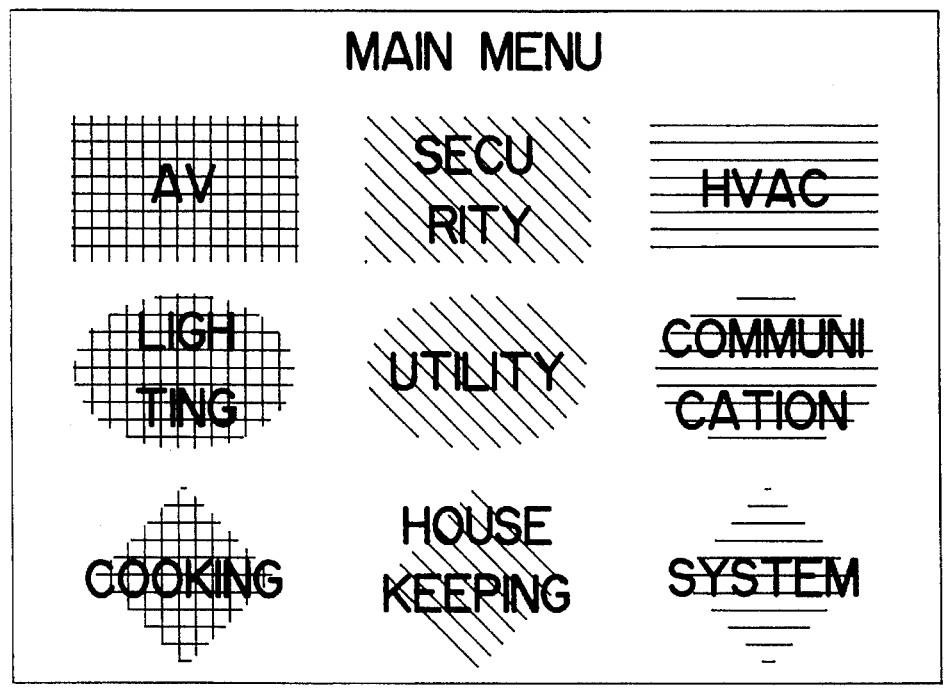
MENU ON TV
20
 YELLOW
 GREEN
   BLUE

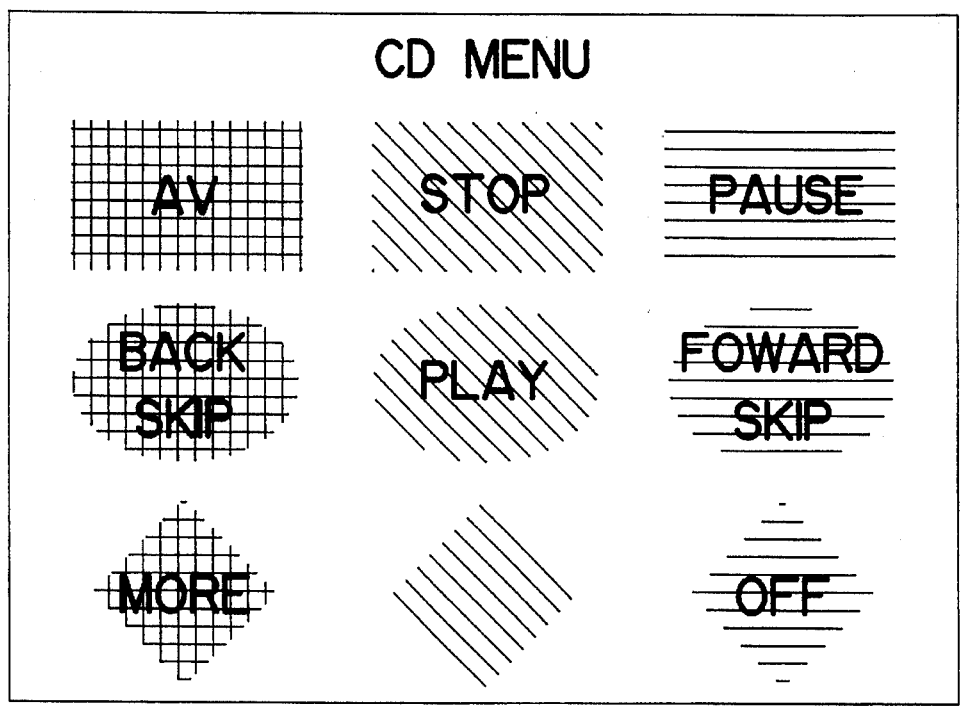

5,500,794

DISTRIBUTION SYSTEM AND METHOD FOR MENU-DRIVEN USER INTERFACE

FIELD OF THE INVENTION

The present invention generally relates to menu-driven systems and, more particularly, it relates to a system for distributing menus throughout a home.

BACKGROUND OF THE INVENTION

Some examples of typical user interfaces for controlling home systems include computer displays with touch screens, dedicated display devices such as LCD panels with buttons or a touch screen or hand-held remote controllers. All of these examples are devices which are dedicated for control only. The users require extra space and incur extra expenses for them.

In some cases, these display devices are installed into walls. In these cases, special installation work is necessary and it becomes very difficult to modify the devices and/or their location. In the case of hand-held remote controllers, the display capabilities are limited and the functions are typically dedicated to specific purposes such as lighting control.

A control system for use with a home automation system is shown U.S. Pat. No. 5,086,385. In the '385 patent, FIG. 1 shows interconnections among various appliances and sub-systems of the home or office building. Via data bus 12, a processor 10 controls the appliances and sub-systems throughout the house. As shown, the system may also include connections to a CEBUS or SMART HOUSE 40.

SUMMARY OF THE INVENTION

The present invention involves an apparatus and method for distributing control menus over a multi-channel distribution network throughout a home. The invention includes a control processor for centrally generating at least one control menu as video information on an available channel of the multi-channel distribution network and for executing commands received over the distribution network. The control menus are received and displayed by a display device on the channel selected by the control device. A user command receiver device, located proximate to the display device, receives user commands related to the displayed menu and delivers the user commands, via the distribution network, to the control processor for execution.

BRIEF DESCRIPTION OF THE DRAWINGS

The invention is best understood from the following detailed description when read in connection with the accompanying drawings, in which:

FIG. 4 is an exemplary embodiment of a compact disk (CD) control menu displayed for use with the remote control of FIG. 1.

DETAILED DESCRIPTION

The present invention involves a system with which users of home systems can easily access control menus anywhere throughout a home system. One aspect of the present invention includes central generation of control menus, communication of user commands, distribution of control menus responsive to user commands, display of control menus, execution of selected menu options displayed on the control menu. These respective functions can be implemented, for example, using a personal computer (PC), an infra-red (IR) remote control, a home distibution network (coaxial cables, e.g., CEBus or radio frequency (RF) transmissions), television (TV) receiver, and the personal computer (PC).

Some important advantages of the present invention include 1) that menus are distributed to any place in a home, 2) the users can control the home system from any display location in the home, 3) the users can control outside services from any display location in the home, 4) all conventional television receivers can display menus, 5) different menus can be distributed at the same time to different display locations, 6) the number of menu generating devices is reduced to one per home rather than one per display location, and 7) interface boxes for outside services is reduced to one per home rather than one per display location.

Figure 1:
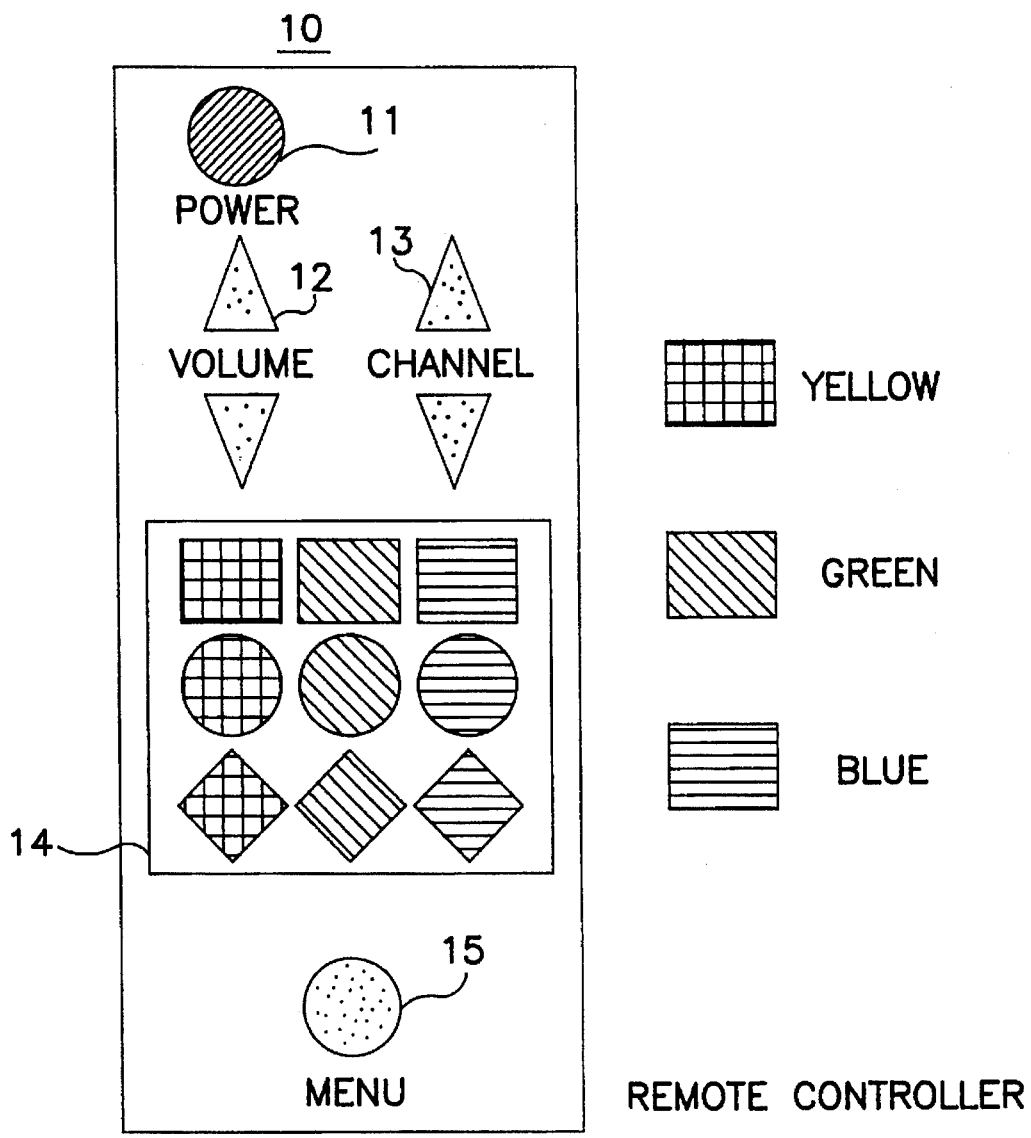
FIG. 1 is an exemplary embodiment of a remote control keypad suitable for use with the present invention.
Figure 2:
FIG. 2 is an exemplary embodiment of a main menu displayed for use with the remote control of FIG. 1.

FIGS. 1 and 2 illustrate exemplary embodiments for an easy-to-use combination of remote control keypad 10 and the corresponding display menu configuration 20, respectively, for use with the present invention.

The remote control keypad 10, as shown in FIG. 1, includes buttons for typical control functions such as power 11, volume 12 and channel 13. In addition, however, the exemplary embodiment of keypad 10 includes a section having an array of buttons 14 which vary in their attributes as well as a menu button 15 for initially calling up a menu or closing a menu down.

Continuing with keypad 10, each button in the array 14 has associated attributes which allows a user to quickly identify and match the button with an option on the displayed menu. For example, in the exemplary embodiment of keypad 10, the array of buttons 14 is arrayed in a 3×3 motif in which each column is the same color (yellow, green, and blue) and each row is the same shape (rectangle, circle, rhombus). In the exemplary embodiment, the associated attributes of the buttons have a substantial match to the configuration of the displayed menu 20.

As shown in FIG. 2, the exemplary embodiment of the main menu, in accordance with keypad 10, displays a 3×3 array providing 9 options for selection: 1) audio/visual (AV), 2) Security, 3) heating/ventilation/air conditioning (HVAC), 4) Lighting, 5) Utility, 6) Communication, 7) Cooking, 8) Housekeeping, 9) System. It should be noted that additional options may be available in the main menu (or in the AV menu) directed to the different program services to which a particular home subscribes (e.g., CATV, direct broadcast system DBS, etc.).

Each option on the menu has attributes associated therewith which are designed to substantially match those on keypad 10. For example, the first row of menu 20 shows rectangles, the second row shows circles, and the third row shows rhombuses.

Figure 3:
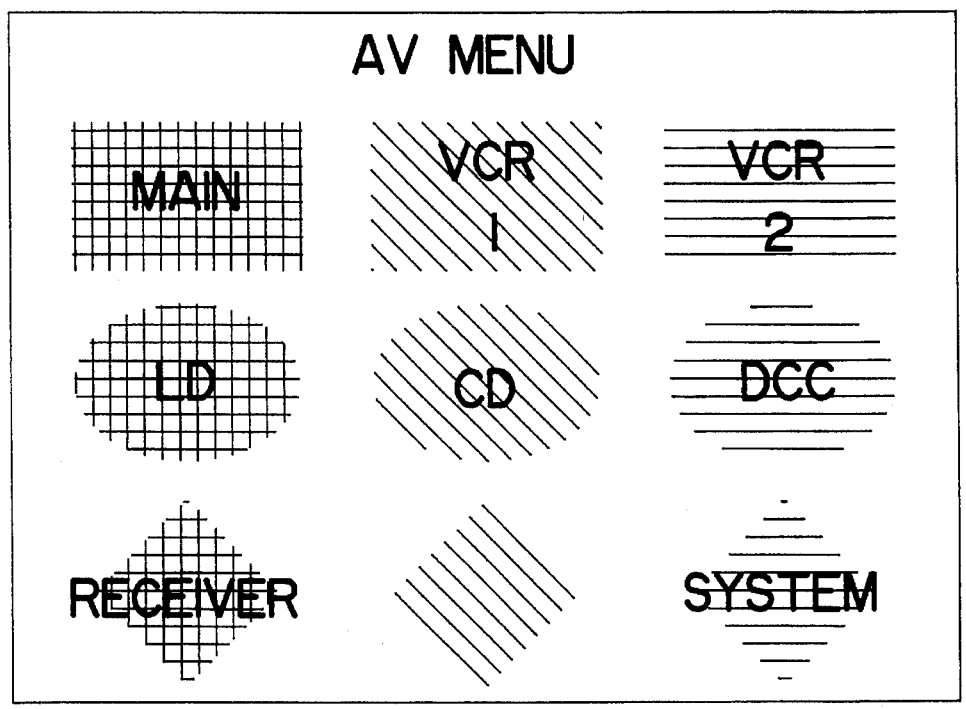
FIG. 3 is an exemplary embodiment of an audio-visual (AV) control menu displayed for use with the remote control of FIG. 1.

Continuing with FIGS. 2–4, if a user presses the button in the first row and first column, (i.e., the yellow rectangle which has the same attributes as the displayed "AV" item), the remote controller sends out, via an IR transmission, a message simply indicating that the depressed button position is first row and first column. It should be noted that, in the exemplary embodiment of the present invention, the remote controller does not know that the button in the first row and first column is for "AV Menu". The translation of this selection occurs in the processor which generates the menus. That an exemplary remote controller is not limited to a particular function provides additional flexibility in the present invention such that new items can be programmed into a menu without affecting the usefulness and operability of the predetermined remote control keypad 10.

Continuing, when the first row, first column button is pressed, the menu generating processor then generates the "AV Menu", illustrated in FIG. 3, and shows it on the TV instead of "Main Menu". As seen, the "AV Menu" includes 8 items: 1) Main, 2) VCR-1, 3) VCR-2, 4) LD, 5) CD, 6) DCC, 7) Receiver, and 8) System. In this example, one background picture does not have an item to be selected.

In this case, suppose the user presses the button in the second row and second column, which is a yellow rectangle corresponding to "CD" item on the displayed menu, the menu generating processor activates the compact disc player and generates the "CD Menu" and shows it on the television display, as illustrated in FIG. 4. The user can easily control the CD player using the displayed menu even if the CD player is in another room.

Figure 5:
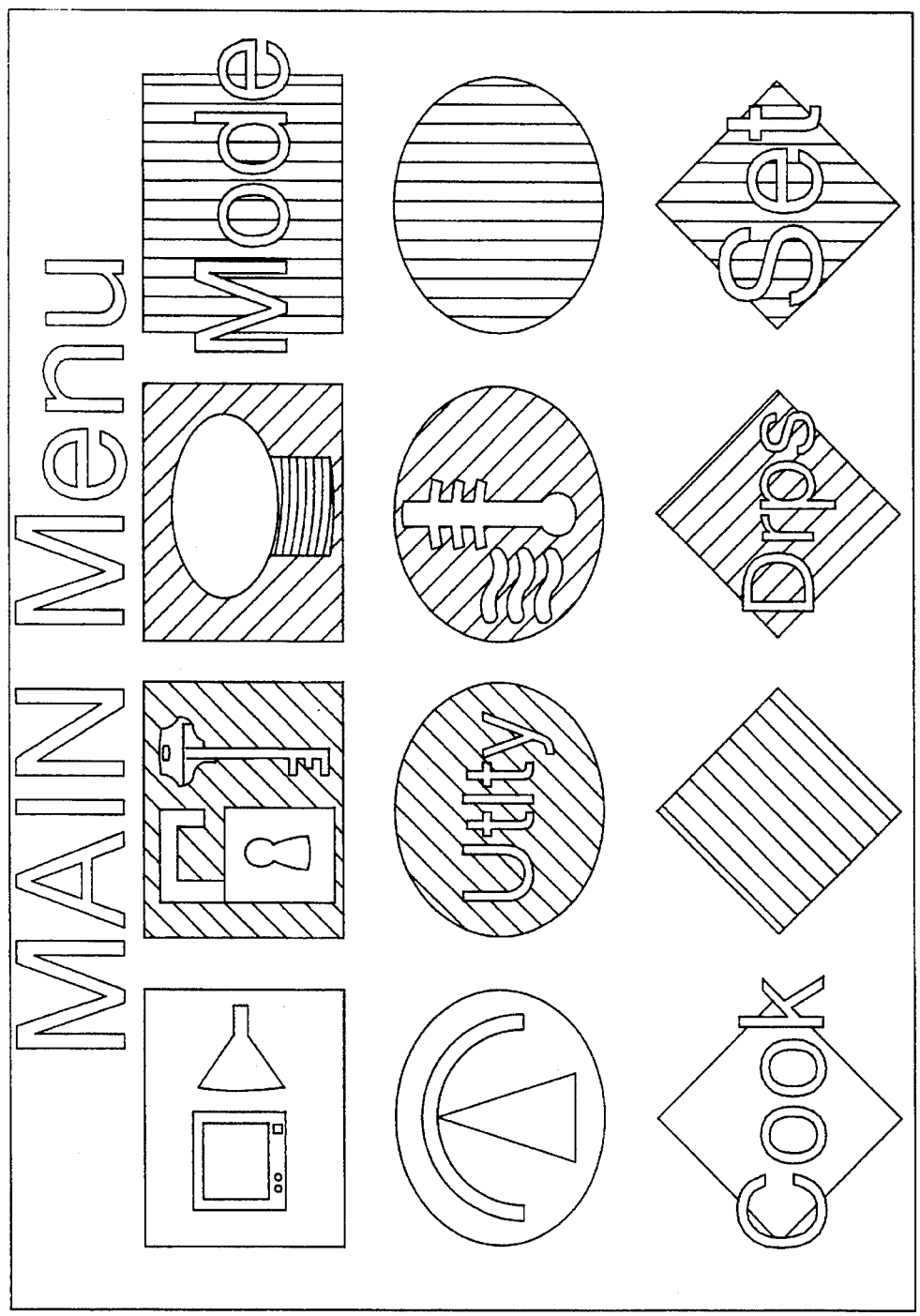
FIG. 5 is an alternate embodiment of the main menu of FIG. 2.
Figure 6:
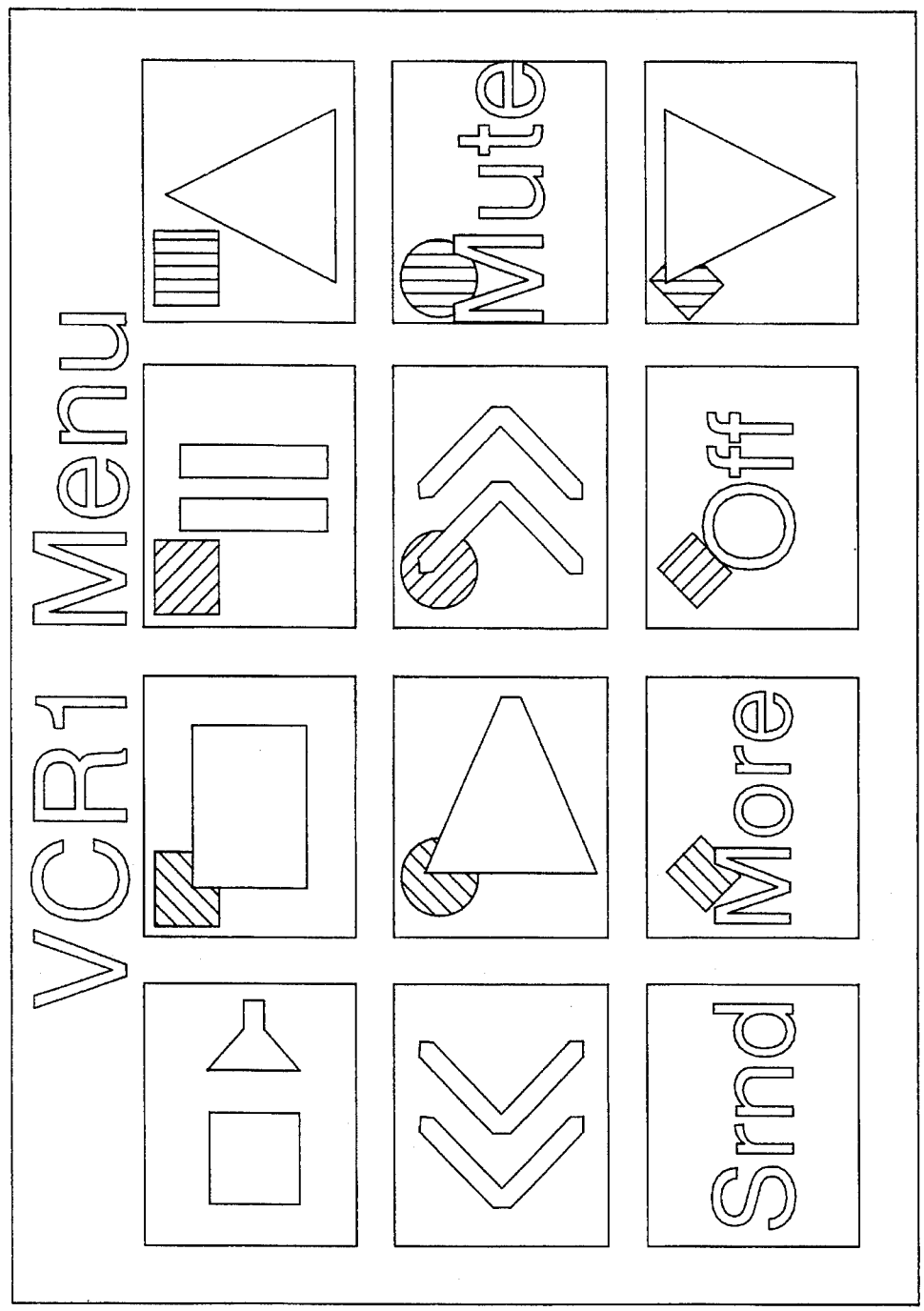
FIG. 6 is an alternate embodiment of a VCR menu using graphics rather than text.

It should be noted that although in FIGS. 2–4 each available option on the menu is indicated using text, in an alternate embodiment shown in FIGS. 5 and 6, graphics could be used to indicate the available functions from which selections can be made.

Figure 9:
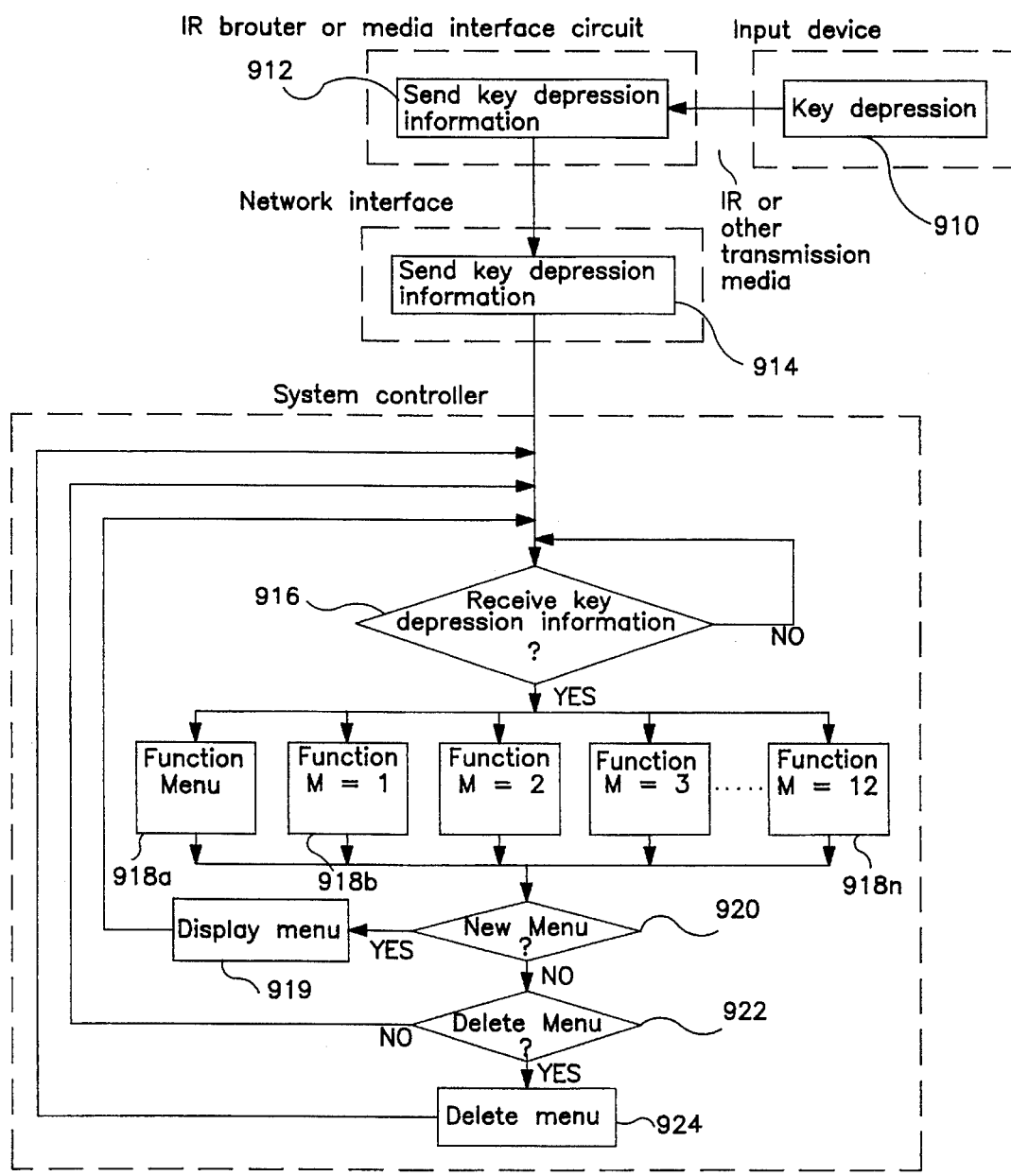
FIG. 9 is a flowchart showing an exemplary sequence of commands selected/executed when using the present invention.

FIG. 9 is a flowchart illustrating an exemplary sequence of options (or functions) selected when employing the present invention. It should be noted that, although in the exemplary embodiment certain steps are represented as occurring within a particular device (e.g., step 914 occurs in network interface), it is contemplated that the steps may be rearranged, merged into a single device or further separated into more devices.

Referring to FIG. 9, first, in step 910, a key corresponding to a selected option is depressed. The information relating to the depressed key is sent to an IR brouter or other media interface via an IR transmission or other suitable transmission method (e.g. voice recognition) which is represented by the arrow between step 910 and 912.

In turn, the media interface circuit sends the key depression information, as indicated in step 912, to a network interface which is represented by the dotted line around step 914.

Next, the network interface transmits the received key depression information to the system controller, represented by the dotted line around steps 916–924. Within the system controller it is determined, at step 916 whether key depression information has been received. If no information has been received, the system controller waits at step 916; if new information has been received, the system controller, in view of the menu known to have been displayed, proceeds to decode and execute, as represented by steps 918a–918n, the function related to the received key information.

Once completed, at step 920, the system controller determines whether a new menu has been requested: if the answer is no, the procedure jumps to the delete menu inquiry, step 922, otherwise the procedure executes a function which displays the requested new menu as shown in step 919 and returns to step 916. The new menu can be a starting menu (e.g. the main menu shown in FIG. 2) if there is no current menu, a device control menu (e.g. the CD control menu shown in FIG. 4) or any other menu suitable for function selection in a particular network.

If, at step 922, it is determined that the user desires to delete the current menu, the menu is deleted as shown in step 924 and the procedure, waiting for the next command, returns to step 916; otherwise, the procedure immediately returns to step 916 from step 922.

In addition to the basic display menu and select, because the menu is actually a video signal transmitted on a specific channel, as described in detail below, if the display device (TV) or another device (VCR) connected to the system provides for a picture-in-picture (PIP) feature, the present invention is still operable. In the case of PIP, the menu can be displayed in either the large or small window, in either mode, selection of the available options is fully functional. This is so because the system controller "knows" when it is currently providing a menu to a display location, thus, any commands received from that display location are interpreted in light of the "known" displayed menu.

Once a button is pressed, the signal sent from the remote controller 10 is received, delivered to the menu generating processor and executed. As mentioned, in some cases, the processor sends control commands to other devices connected to the network (e.g., CD, Security). It may generate and send for display, another on-screen menu (e.g., main to AV). It may generate, and send for display an updated menu which indicates the status of the system or devices. Or, it may turn off the on-screen menu function.

To execute the various commands available in the menus, the menu generating processor has access to not only the display device (TV) including a remote receiver but also to the CD player, the VCR(s), the security system, etc.

In the present invention, a CEBus coaxial network (CXBus) is used as a transmission medium. The CEBus is a home communication and control standard developed by the Electronic Industry Association. The CEBus standard provides for establishing a local area network, or LAN, over several physical distribution media, for example, a power line (PLBus), twisted pair (TPBus), coaxial cable (CXBus), infrared light (IRBus), and lower power radio (RFBus).

The CXBus network provides the information necessary to facilitate the exchange of data and control information over the coax medium within a home. The detailed description of the CXBus network may be found in the "EIA-XXX.03 Physical Layer and Media Specifications". The CXBus is also described in O'Brien Jr., "Physical and media specifications of the CXBus", IEEE Transactions on Consumer Electronics, Vol. 37, Number 3, August, 1991, which is herein incorporated by reference.

Figure 7A:
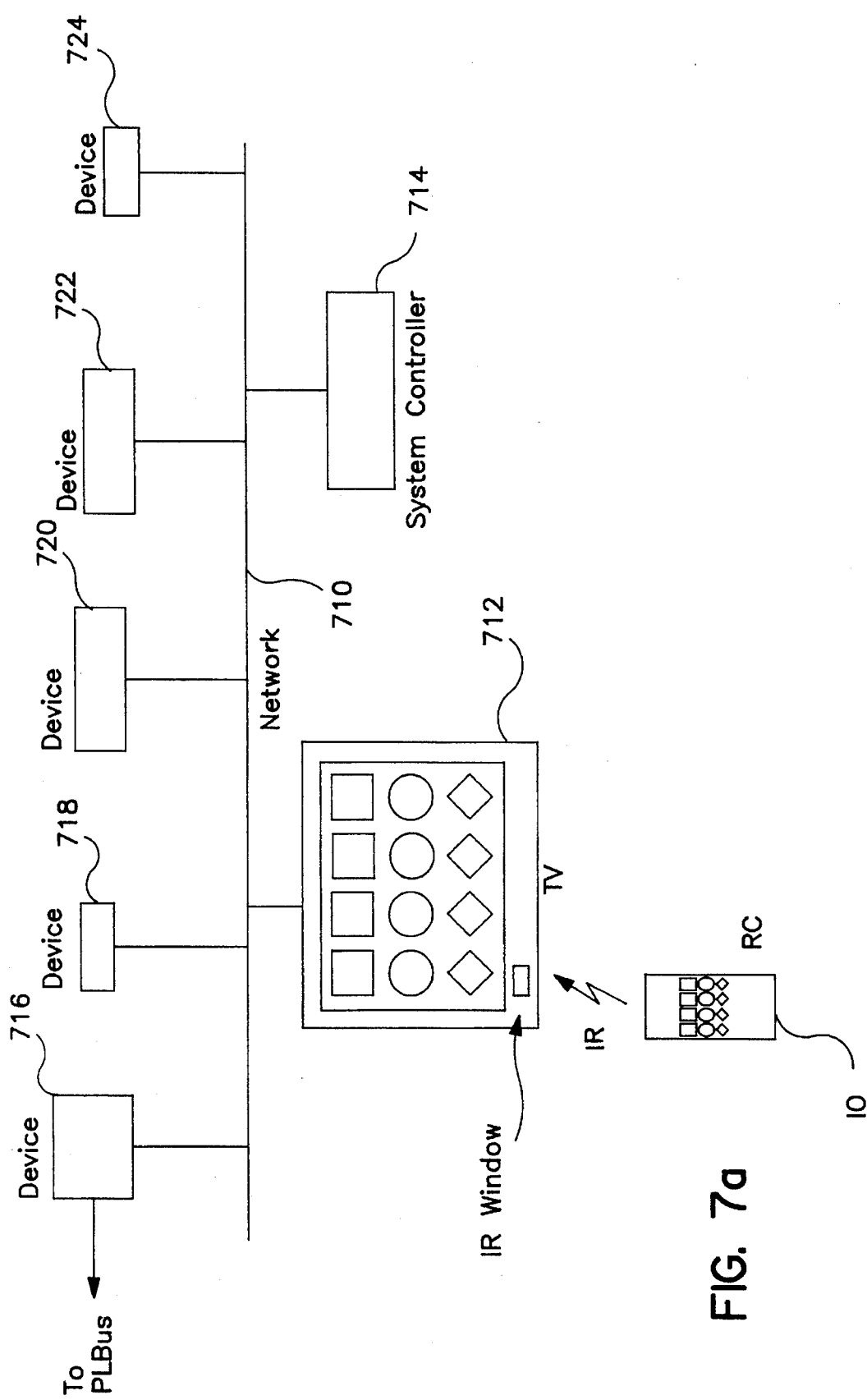
FIG. 7a is a high level functional block diagram of the network interconnections of exemplary devices used to implement the present invention.

FIG. 7a shows the basic concept of connection and operation of the present invention employing a distribution network implemented with a CXBus. Although the CXBus standard provides for a dual-cable configuration (internal and external), these are not shown for the sake of clarity.

As shown in FIG. 7a, a network 710 interconnects the TV 712, the system controller 714 (which serves to generate menus) and all other devices 716–724 which can be controlled via the menu system. Remote controller 10, via IR signals, sends commands to TV 712 (or an appropriate interface) which, in turn, formats the commands and delivers them, via network 710, to system controller 714.

It should be noted that in the exemplary embodiment of the present invention, the remote controller 10 communicates with the remote interface (not shown) within TV 712. TV 712, in turn, communicates with an interface box 718 (which may be inside, along side or outside TV 712) for converting the received IR command into a packet to be transmitted along a control channel of the network 710 (CEBus).

It is contemplated, however, that the remote controller 10 may communicate with an external remote interface which is coupled to the network to control the TV 712 and the other devices coupled to the network. For example, a contemplated alternate embodiment is shown in FIG. 7b.

Figure 7B:
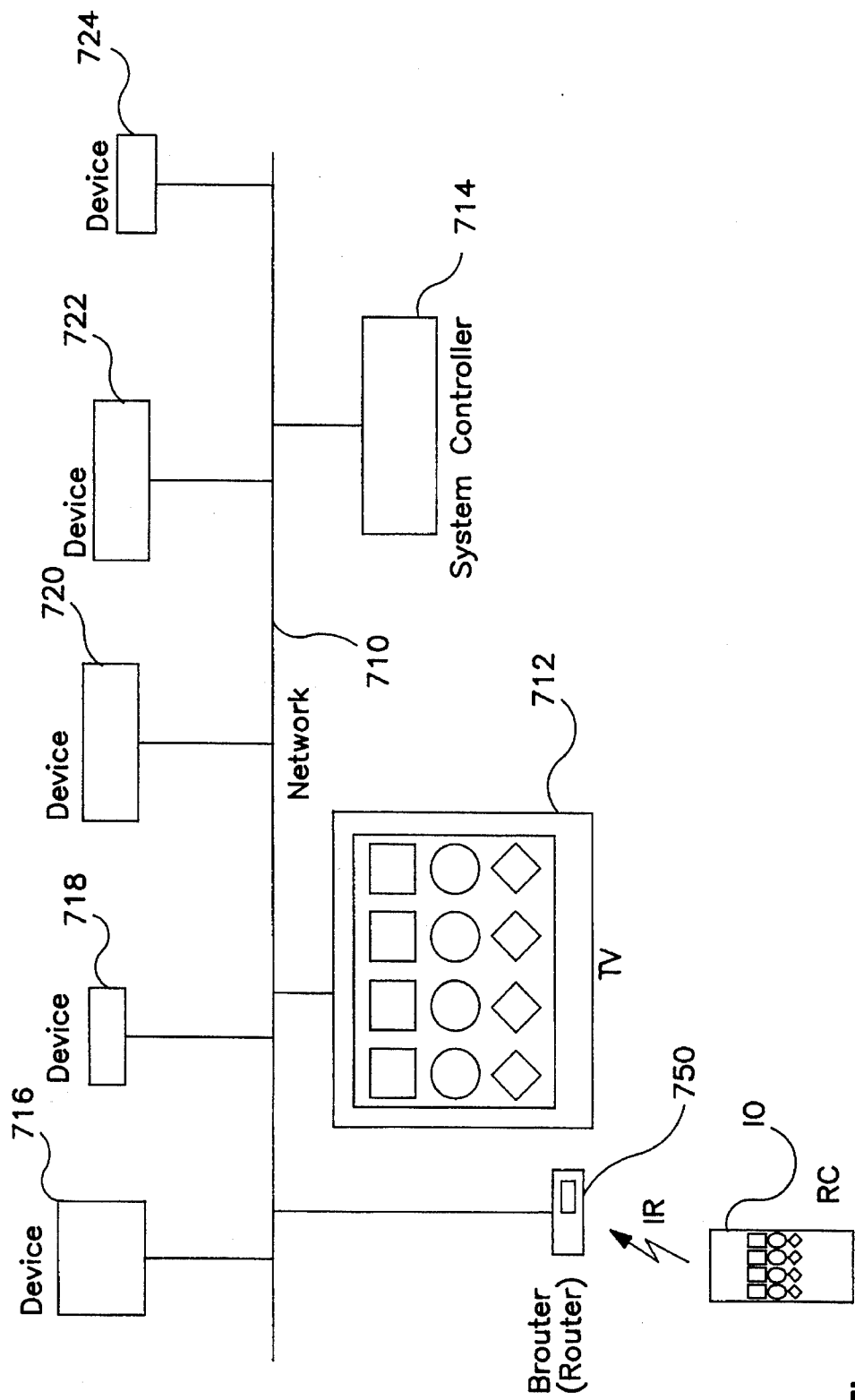
FIG. 7b is a high level functional block diagram of FIG. 7a including a brouter.

In FIG. 7b, the remote controller 10 communicates directly with a brouter 750 which is directly connected to network 710. In this case, brouter 750 converts the IR signal into a signal compatible for transmission along the network 710 and forwards the packet accordingly. For example, brouter 750 could include the functionality to send a command directly to TV 712 (e.g., volume or channel control) or it can be configured such that all received commands are sent directly to system controller 714 which, in turn, distributes the commands accordingly.

Continuing with FIG. 7a, as mentioned above, the system controller 714 then executes the commands in accordance with the menu displayed at the time of the received command. It should be noted that in the exemplary embodiment of the present invention, the functions of the system controller 714 (e.g., menu generation, command execution and distribution) are performed by a personal computer connected to network 710. It will be appreciated by those skilled in the art, that, as with the interface box 718, the functions of the system controller may be integrated within another device such as TV 712. Since these devices typically include a processor and sufficient memory, the above mentioned functions may be implemented using that processor, for example, in a shared mode.

It should be noted that the CEBus differs from most LANs in that its architecture provides for a control channel as well as data channels. Data channels are presently supported on the TPBus and CXBus. Both a TPBus and CXBus are wideband media, and are able to support a large number of signals that have been spectrally multiplexed onto the medium. The control channel is a narrow band signal used as a party line for products connected with the medium. Communication on the party line is by digital packetized signalling where a packet is a bundle of "1s" and "0s" arranged in a set of fields that include a destination address field and a message field.

Products use the control channel to send short commands, a small amount of data, or to negotiate for spectrum space in which to place their wideband signals, which are inappropriate for the control channel. The data signals may be inappropriate because of the modulation type, duration, or bandwidth needed to accommodate them. In the exemplary embodiment, the CXBus is selected because of its ability to handle wideband signals such as digitized audio and video.

Continuing with FIG. 7a, many home system devices such as lighting, HVAC and/or security may be indirectly coupled to network 710 through a bridge/router, for example device 716, and a PLBus. In this case, the options selected via a menu are sent out as commands to the PLBus devices via bridge/router 716. Generally, bridge 716 may change the format of the command to be delivered to one of the PLBus devices and also it may drive the command with different signal levels depending on the appropriate standards. Another example where a bridge/router would be need is where a telephone is controlled using the TPBus.

Figure 8:
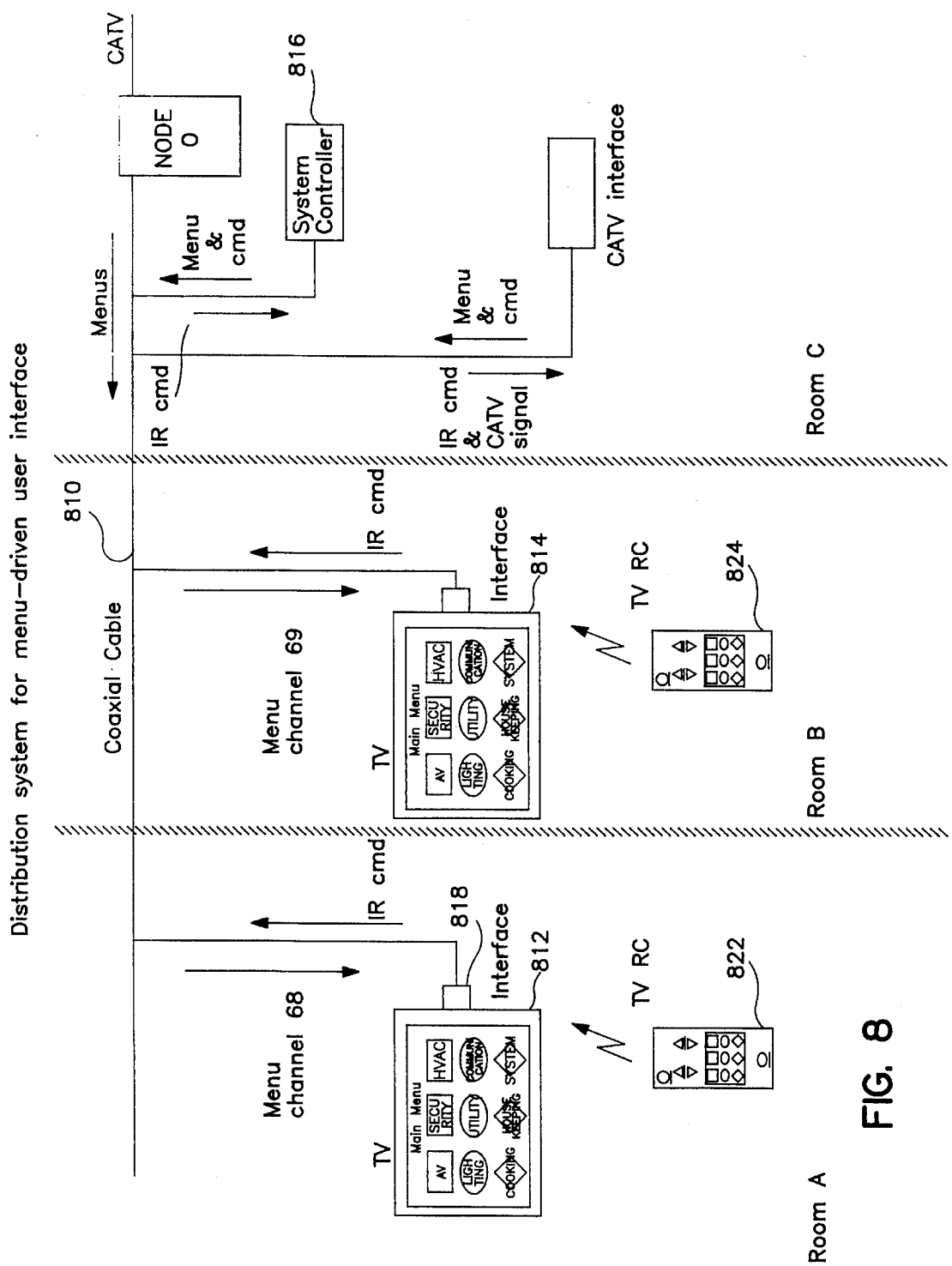
FIG. 8 is a high level functional block diagram of the network shown in FIG. 7a employed in an exemplary application.

FIG. 8 shows a functional illustration of an exemplary application employing the present invention. As shown in FIG. 8, two TVs 812 and 814 are connected, via an appropriate interface, to CXBus 810. Commands are received by the respective TVs from remote controllers 822 and 824. These commands are delivered to system controller 816 which, in turn, executes the commands. It should be noted that the user commands, although shown in FIG. 8 as being delivered via remote controllers 822 and 824, may be delivered via other suitable interface circuitry such as voice recognition circuitry.

By way of example, a user in Room A presses the "menu" button on remote controller 822. This generates an IR packet with the command "menu", which is sent to the TV 812. The CEBus network interface 818, attached to the TV 812, in turn generates a menu-request CEBus packet to the system controller 816 in Room C, over the coaxial cable 810. The system controller 816 receives that packet, which triggers generation of a menu. The base band video output, representing the requested menu, from the system controller 816 is modulated to be sent over a video channel, for example, channel 6.

This signal is converted to an available, higher channel such as channel 68 by another processor, for example, "Node 0". It should be noted that in general a Node 0 can perform the following functions:

1) combines the signals from the internal cable;
2) block frequency converts data channel signals for distribution back on the internal or external cables;
3) amplifies block converted data channel signals to drive the required number of external or internal cable branches, overcoming the losses of splitters and cables;
4) provides amplification for distributing CATV or OFF-Air TV signals;
5) provides, optionally, a CATV signal return path for two-way cable services; and
6) provides control channel regeneration and distribution on all internal cables.

The need to place the video signal representing the menu on a higher channel arises from the CATV and off-air connection to the coaxial cable 810. The CATV and off-air connection uses the lower channels, therefore, the menus are sent over unused or available channels at the higher end of the available spectrum. This is generally accomplished by Node 0 by accepting video signals (from the system controller or other internal devices) on an internal cable of the CEBus, where the internal cable has a bandwidth of approximately 96 MHz, and block converting these signals to appropriate channels on an external cable of the CEBus to which the CATV feed is directly connected.

In the present case, system controller 816 is providing menus for two separate TVs thus two separate channels (e.g., channels 68 and 69) are used. This can be accomplished several ways.

First, system controller 816 may be equipped with more than one video card such that, for example, if two users requested two different menus at two different TVs, system controller 816 can drive two separate video cards to produce video signals modulated for two different channels representing the two requested menus. An alternative embodiment, assuming access to sufficient memory, would be to time multiplex a single video card or to divide the display into multiple display areas. In the case of multiple display areas, each of the concurrent users would know what the other user was doing. The multiple display areas can be accomplished, for example, by compressing the control menus to a suitable size in the video memory of the system controller and then appending or merging them together depending on how many are needed.

Continuing with FIG. 8, along with the video signal representing the requested menu, control information is sent to TV 812. The control information is used to automatically tune TV 812 to channel 68 thereby permitting the user to see the requested menu on the TV screen. Automatically tuning TV 812, in the preferred embodiment of the present invention, is accomplished via the control channel of the CEBus.

It should be noted that since, in the exemplary embodiment of the present invention, a personal computer is used to generate the menus and execute the commands, an optional feature of the present invention is menu modification and/or menu building by the user. In this way, a user can customize the options displayed on any given menu.

Another optional feature of the present invention is automatic menu option generation. This is accomplished by having the system controller 816 periodically poll the network, including all busses (e.g., CXBus, TPBus, PLBus) to determine which devices are connected/available for use which, if possible, includes the status of a particular device (i.e., VCR is currently recording). And, with an additional device identifier (i.e., one that indicates from which rooms this device may be controlled), menus can be generated depending from which room the menu is being requested.

Moreover, the CATV interface box 830 may also be used for interaction and menu generation. The role of the CATV interface box is to convert incoming signals for menus to usable video signals in the home, and deliver the menu to the distribution network. Thus, in the case of getting a menu from CATV interface box 830, a user in room A presses "menu" button on a TV remote controller and selects "CATV menu" from the displayed options. The CATV interface box 830 in room C receives a request to get CATV menu, converts the CATV menu signal to a baseband video signal then operates in a similar manner to system controller 816. As mentioned above, because an interface box such as CATV interface box 830 is generally equipped with a processor and memory, the above described functions could be programmed directly into a properly equipped interface box.

Although the invention is illustrated and described herein as embodied in a method and system for control menu distribution, the invention is not intended to be limited to the details shown. Rather, various modifications may be made in the details within the scope and range of equivalents of the claims and without departing from the spirit of the invention.

What is claimed:

1. Apparatus for distributing control menus throughout a home:

multiple video channel distribution network;

control means for centrally generating at least one control menu in the form of a video signal on an available channel of the distribution network and for executing commands received over the distribution network;

display means for receiving the control menu in the form of a video signal and displaying the control menu on the channel selected by the control means; and receiver means, located proximate to the display means, for receiving user commands related to the displayed menu and for delivering the user commands, via the distribution network, to the control processor.

2. The apparatus of claim 1, wherein the control means further generates control information related to the channel on which the control menu in the form of a video signal is transmitted and the control information is for automatically setting the channel of the display means.

3. The apparatus of claim 1, wherein the control means further includes means for, if more than one user requests menus concurrently, generating a control menu in the form of a video signal on a single channel having multiple separate areas such that each area displays a menu corresponding to one of the users.

4. The apparatus of claim 1, wherein the control means further includes means for, if more than one user requests menus concurrently, generating a separate control menu in the form of a video signal for each user on a respectively different channel.

5. The apparatus of claim 1, wherein the display means is a television.

6. The apparatus of claim 1, wherein the distribution network includes a CXBus.

7. A method for distributing control menus throughout a home:

providing a multiple video channel distribution network;

receiving a request for a control menu;

selecting an available channel on the distribution network;

generating, centrally, at least one control menu in the form of a video signal for transmission on the available channel of the multiple video channel distribution network;

receiving, at a display location, the control menu in the form of a video signal from the distribution network;

displaying, at the display location, the control menu on the selected channel;

receiving user commands related to the displayed control menu and delivering the user commands, via the distribution network, to a central location; and executing the user commands received over the distribution network.

8. A method for distributing a plurality of control menus throughout a home:

providing a multiple video channel distribution network;

receiving, concurrently, a plurality of requests for control menus;

selecting an available channel on the distribution network;

generating, centrally, a control menu, in the form of a video signal and having multiple areas, for transmission on the selected channel of the multiple video channel distribution network, wherein each of the multiple areas itself includes a control menu for a separate user;

receiving, at a display location, the control menu in the form of a video signal from the distribution network;

displaying, at the display location, the control menu on the selected channel;

receiving user commands related to the displayed control menu and delivering the user commands, via the distribution network, to a central location; and executing the user commands received over the distribution network.

9. A method for distributing a plurality of control menus throughout a home comprising the steps of:

providing a multiple video channel distribution network;

receiving, concurrently, a plurality of requests for control menus;

selecting an available channel on the distribution network for each of the requests;

generating, centrally, the requested control menus in the form of respective video signals for transmission on the selected channels of the multiple video channel distribution network;

receiving, at a plurality of display locations, respective control menus in the form of video signals from the distribution network;

displaying, at each display location, the respective control menu on the selected channel;

receiving user commands related to the displayed control menu and delivering the user commands, via the distribution network, to a central location; and executing the user commands received over the distribution network.

* * * * *